Figure 1A:
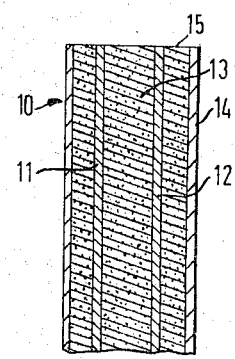
Figure 1B:
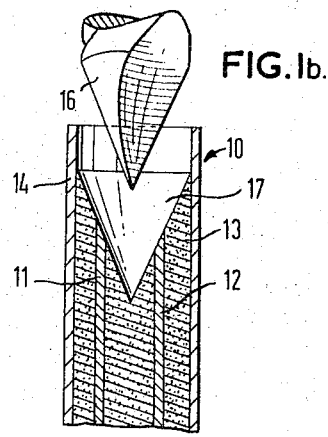
Figure 1C:
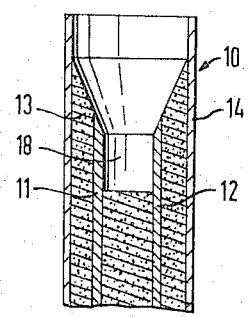

April 18, 1967

H. PUGH ET AL 3,314,129

THERMOCOUPLES

Filed Aug. 8, 1963

3 Sheets-Sheet 1

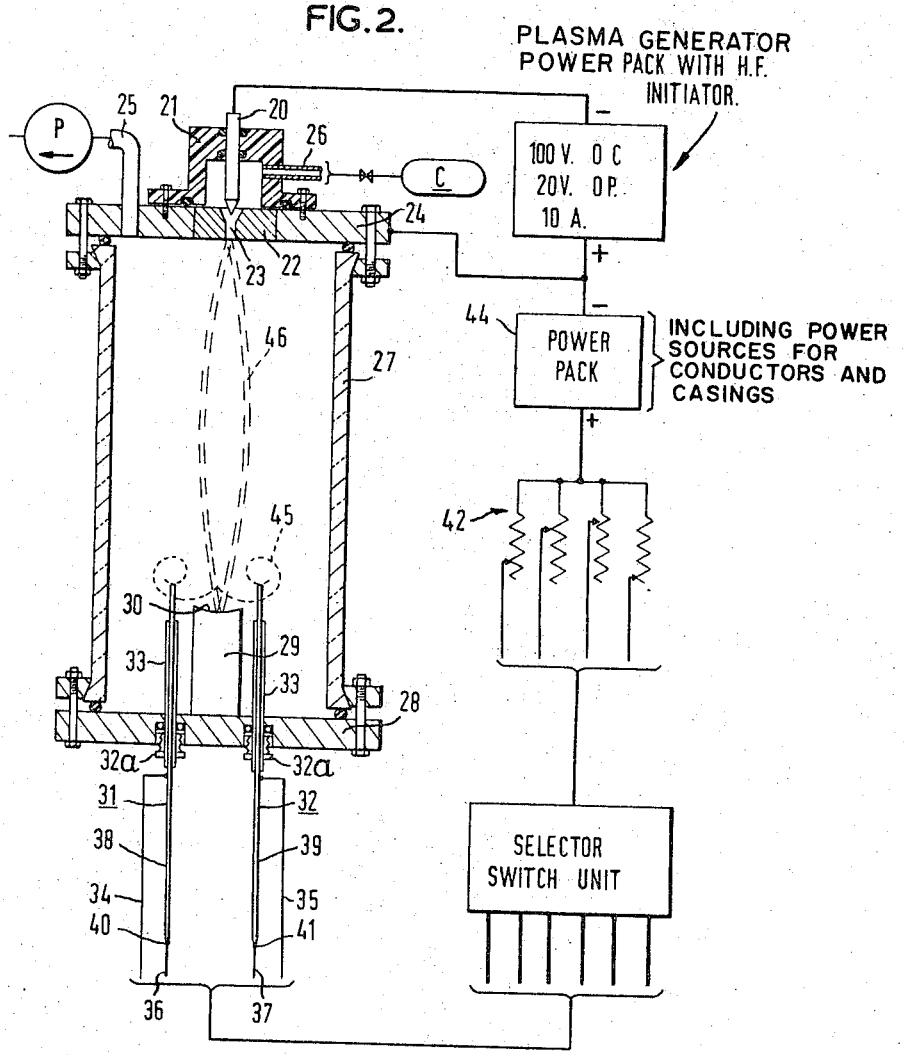

United States Patent Office 3,314,129
Patented Apr. 18, 1967

3,314,129
THERMOCOUPLES
Harold Pugh, Thelwall, Warrington, and George Gauterin, Saughall, Chester, England, assignors to United Kingdom Atomic Energy Authority, London, England
Filed Aug. 8, 1963, Ser. No. 300,774
Claims priority, application Great Britain, Aug. 14, 1962, 31,224/62
3 Claims. (Cl. 29—155.5)

This invention relates to thermocouples and to apparatus applicable to the manufacture thereof.

One proposed method for the welding together of two thermocouple conductor wires makes use of a gas plasma derived from a plasma generator. The generator is mounted in one end of a vacuum vessel and the wires are mounted in the other end with abutting ends inside the vessel and are electrically connected as an anode with respect to the generator. The vessel is pumped down to a low pressure, the generator is energized and a voltage applied to the wires such that the abutting ends are subjected to a heating action by the gas plasma. In this way a fusion weld is effected at the abutting ends of the two wires.

The phrase "gas plasma heating process" is hereinafter used to denote the heating, in a rarefied atmosphere, of a work piece by a gas plasma derived from a plasma generator with respect to which the work piece is electrically connected as an anode, such a generator being understood to be one which, in the manner of a torch, ejects a gas plasma ionised internally such as by electrodes or by radiofrequency induction heating.

According to a further aspect of the present invention a thermocouple cable having a tubular metal casing is subjected to a gas plasma heating process in which the casing forms the work piece so that one end of the casing is fused to form a sealed end closure.

This aspect of the invention has the particuluar advantage that it enables the casing to be end sealed without using a separate end cap.

According to a further aspect of the present invention a shaped end of a thermocouple cable having conductors surrounded by refractory electrical insulating material in a tubular metal casing is subjected to a gas plasma heating process in which first the conductors form the work piece so that adjacent ends of the conductors are fused to form a thermocouple junction and second the casing forms the work piece so that the end of the casing is fused to form a sealed end closure insulated from the junction by the insulating material.

The shaping of the end of the thermocouple cable preferably includes a substantially conical recess formed in the insulating material such that the conductors protrude into the bottom of the recess.

This further aspect of the invention has particular advantage in that it enables the sealed end closure to be formed directly after the forming of the junction without disturbing the work piece, in other words there is no need to remove the cable from the rarefied atmosphere for treatment between the forming of the junction and the forming of the sealed end closure.

Thermocouples having a sealed end closure insulated from a junction in accordance with the invention have particular application for the measurement of high temperatures in reactive or corrosive environments. The sealed end closure insulated from the junction provides for the ready testing of the thermocouples and prevents leakage of corrosive or reactive material through the insulating material.

Also according to the invention, apparatus for carrying out a gas plasma heating process on a work piece assembly comprises an evacuable vessel to accommodate the assembly, a plasma generator adapted to provide a gas plasma in said vessel, means for sealing in passage through said vessel a plurality of electrical conductors to mutually insulated parts of the assembly, and an associated electrical circuit externally of said vessel, said circuit including selective switching means for sequentially connecting each of said assembly parts as an anode with respect to said plasma generator by way of said conductors.

By way of example, the invention will now be described in its application to the production of thermocouples from thermocouple cables each having "Chromel" and "Alumel" (trademarks) conductor wires embedded in compacted refractory electrical insulating material (e.g. magnesia) surrounded by a tubular stainless steel casing.

Figure 3:
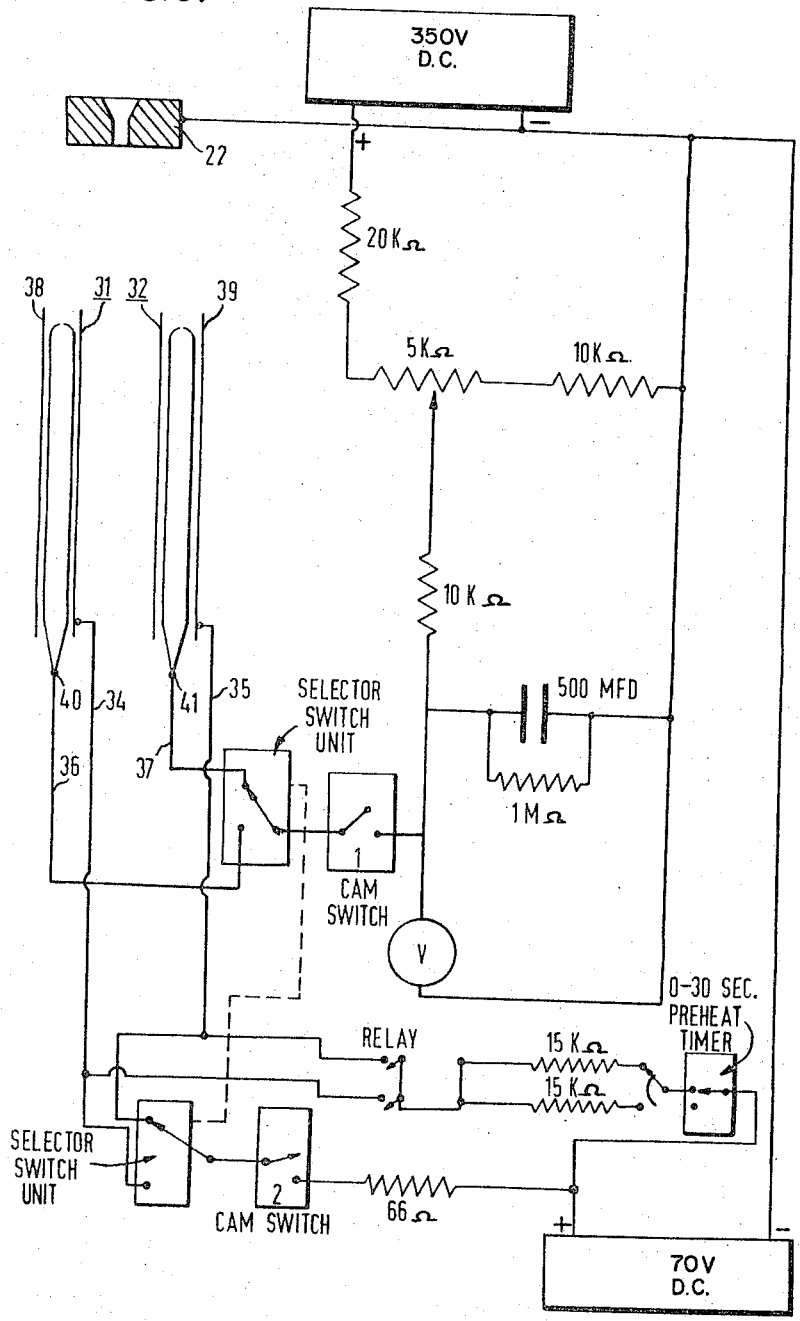

In the accompanying exemplifying drawings, FIGURES 1a to 1f show (on an enlarged scale) various stages in the production of a thermocouple from a thermocouple cable, FIGURE 2 shows diagrammatically the apparatus used, and FIGURE 3 is a schematic representation of the associated electrical circuit.

FIGURES 1a to 1f show a thermocouple cable 10 having conductor wires 11, 12 embedded in magnesia 13 surrounded by a tubular stainless steel casing 14.

Figure 1D:
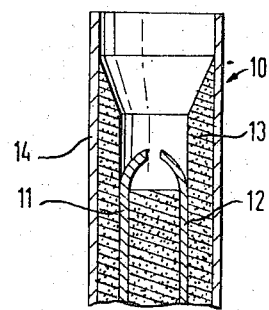
Figure 1E:
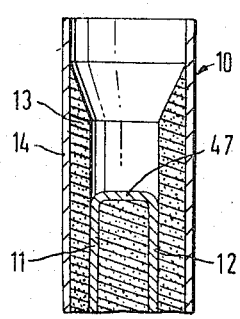
Figure 1F:
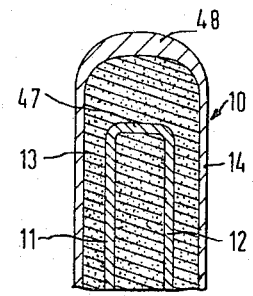

The cable 10 is first cut to length and then lightly filed to give a flat end 15 (FIGURE 1a) of circular cross-section. The end is then shaped using a drill 16 (FIGURE 1b) to include a conical recess 17 in the insulating material 13 of a depth of one cable diameter and then removing the insulating material between the wires to a further depth of one half of a cable diameter as shown by recess 18 (FIGURE 1c) such that the wires protrude into the bottom of the recess, care being taken not to disturb the insulating material projecting beyond the exposed ends of the wires. The exposed ends of the conductor wires are then bent toward each other as shown in FIGURE 1d. A length of close-fitting ceramic (e.g. alumina) tubing 33 (see FIG. 2) is then fitted over the cable casing so that the shaped end projects by one cable diameter. The other end of the cable is stripped of its casing and insulating material for a short length to expose the conductor wires which are conveniently joined together for electrical connection purposes.

FIGURE 2 shows apparatus for carrying out a gas plasma heating process on a work piece assembly, the apparatus comprising a plasma generator comprising a tungsten cathode 20 sealed in an insulating housing 21, the cathode being associated with a water-cooled copper anode 22 having an orifice 23. The housing 21 is sealed to a brass end plate 24 in which the anode 22 is mounted. The plate 24 has a pipe connection 25 to a vaccum pump P and the housing has an inlet pipe 26 for argon gas from a cylinder C. The plate 24 is sealed to a cylindrical vacuum vessel 27 made of glass to the lower end of which is sealed a brass end plate 28. Mounted on the plate 28 in line with the orifice 23 is a stainless steel reflector rod 29 of circular section and having a concave surface 30.

One or more thermocouple cables with shaped ends prepared as described above may be mounted in the vessel. For convenience FIGURE 2 shows two such cables 31, 32 sealed by glands 32a in passage through the end plate 28, though it is to be understood that the apparatus is not limited to two thermocouple cable mounting points. In fact a typical arrangement comprises six cables equispaced round a 1.5" pitch circle diameter. The two cables 31, 32 are shown with their shaped ends inside the vessel projecting from ceramic tubing 33 and terminating in the general region of the reflecting zone 45 of the surface 30 of the reflector 29. Outside the vessel detachable electrical connections 34, 35, 36, 37 are respectively made to casings 38, 39 and joined conductors 40, 41 of the cables 31, 32. These connections lead to a selector switch unit in turn connected to a bank of resistances 42 whose values are determined by the length and diameter of the cables mounted in the vessel. These resistances are connected to the positive side of a power pack 44 which has its negative side effectively connected to the anode 22. The anode 22 and cathode 20 are connected to a welding power pack with H.F. initiator.

It will be appreciated that the electrical circuit associated with the apparatus of FIGURE 2 is provided with switching facilities to cater for the maximum number of thermocouple cables mounted in the vessel, and similarly that the circuit includes a range of components of selected values such as to cater for a range of cable sizes and lengths. Typically the apparatus caters for cable outer diameters in the range 0.01″ (0.25 mm.) to ⅛″ (3.1 mm.) and cable lengths of up to one hundred feet (30 m.).

Thus the electrical circuit of FIGURE 3 shows selective switching means suitable for the two thermocouple cables 31, 32 and electrical component values for cable dimensions of twenty foot (6 m.) length and 0.04″ (1 mm.) outer diameter with a casing wall thickness of 0.004″ (0.1 mm.), each of the conductor wires then being 0.0065″ (0.16 mm.) in diameter. The selector switch unit and cam switches 1 and 2 are operated by a cam shaft driven by an electric motor through a gear box, the motor circuit including push button and cam control to give the required operational sequence.

In operation the vessel 27 is pumped down by the vacuum pump to a pressure of about 100 microns Hg and a short period of time allowed for outgassing of the shaped ends of the cables and the vessel. Argon is then supplied to the plasma generator by way of the pipe 26 until the pressure in the vessel rises to about 10 mm. Hg (which pressure is maintained by continuous pumping) when the generator is energised using the welding power pack with H.F. initiator to strike an arc between the cathode 20 and anode 22 and thereby initiate a high temperature, highly ionized gas plasma 46 issuing into the vessel by way of the orifice 23.

The electrical circuit of FIGURE 3 is then energised to give the following operational sequence.

(1) The preheat timer is operated so that both casings 38, 39 are commonly connected to the power source (casings) through the relay and subjected to a resistance preheat cycle (typically 30 seconds) in which the two cables 31, 32 are heated up to 200° C. thereby drying out any moisture in their shaped ends.

(2) The plasma conductivity is measured by push button application of a fixed low potential to a conductivity probe (which may be one of the cable sheaths) and measurement of the current. The conductivity can be adjusted by adjusting the pressure in the vessel. Typically for an applied potential of 15 volts D.C., the current should be in the range of 50–60 ma.

(3) The motor circuit start button is pressed to give the following cycles.

(4) With the selector switch unt in the position shown, cam switch 1 is closed for a one second cycle during which the 500 mfd. capacitor discharges through the joined conductors 41 of the cable 32. In this way, with a positive accelerating potential from the power source (conductors) applied to the conductors of the cable 32 which are effectively connected as an anode with respect to the plasma generator, they attract a concentration of electrons from the plasma and are therefore subjected to a gas plasma heating process so that the conductors are fused together by electron beam bombardment at the shaped end of the cable 32 to form a thermocouple junction. Such a junction is indicated by reference numeral 47 in FIGURE 1e.

(5) 0.5 second delay.

(6) Cam switch 2 is closed for a six second cycle during which a positive accelerating potential from the power source (casings) is applied to the casing 39 by way of the 66 ohm resistance, which casing effectively is connected as an anode with respect to the generator.

(7) As 5.

(8) As 6.

(9) As 5.

(10) As 6. In this way the casing 39 attracts electrons from the plasma and therefore is subjected to a stepwise gas plasma heating process so that the casing at the shaped end of the cable 32 is fused by way of electron beam bombardment to form a sealed end closure insulated from the junction by the insulating material. Such a sealed end closure is indicated by reference numeral 48 in FIGURE 1f.

(11) Contact is made to operate the selector switch unit so as to switch it to the lower position shown in FIGURE 3, thus enabling cycles 4 to 10 above to be carried out for the cable 31.

The circuit is interlocked to ensure that the operator carries out the preheat cycle before initiating the fusion cycles. It will be appreciated that whilst the anode 22 is operatively maintained at a positive potential with respect to the cathode 20 (the welding power pack with H.F. initiator being designed to give 100 volts open circuit and 20 volts at 10 amps under operating conditions), the work piece (as exemplified by the cables 31, 32) is operatively maintained at a positive potential with respect to the anode of the plasma generator so as to attract electrons from the plasma.

It is to be particularly noted that the apparatus described above provides a fully automatic sequence enabling each one of a number of shaped thermocouple cables to be sequentially operated on and thereby converted to a thermocouple having an integral sealed end closure insulated from its junction by the insulating material already present in the cable. This constitutes a significant achievement in the field of thermocouple development, as will be readily appreciated when it is pointed out that it was previously necessary to weld the conductors to form a junction, then add additional insulating material and a separate end cap which then had to be welded to the casing. By way of contrast, the present invention provides that once the shaped thermocouple cables have been mounted in the vessel 27, they do not then have to be removed until they are in their finished form complete with junction and sealed end closure, i.e. no separate end cap fitting is involved. This represents a considerable saving in time, as is evidenced by the above-described operational sequence from which it can be seen that the total time for steps 4 to 10 is less than half a minute, and that steps 1 to 10 can be carried out in less than a minute.

The conical recess formed in the shaped end of the thermocouple cable provides that the insulating material projecting upwardly beyond the junction is utilised to insulate the sealed end closure from the junction. It is noteworthy that the invention makes possible such fine concentration of the plasma as to be applicable to thermocouple cable of extremely small size. Thus, whilst the apparatus shown in FIGURES 2 and 3 of the drawings has been described with particular reference to its use with thermocouple cable of 0.04″ (1 mm.) outer diameter, the invention is equally applicable to mineral insulated, metal sheathed, thermocouple cable having an outer diameter of only 0.01″ (0.25 mm.). Whilst not essential, the provision of the reflector 29 with its surface 30 is advantageous in that it effectively reflects electrons from the plasma 46 so that the zone 45 thereby defines a region of maximum electron density thus facilitating the fusion steps by giving an improved gas plasma heating effect, particularly when, as described above, a number of cables have their shaped ends terminating in the general region of the zone 45.

We claim:

1. A method of manufacturing a thermocouple from a thermocouple cable having conductors surrounded by refractory insulating material in a tubular metal casing, comprising heating a shaped end of the cable in a rarefied atmosphere by way of a gas plasma derived from a plasma generator by first connecting the conductors electrically as an anode with respect to the generator and bombarding the conductor ends with plasma electrons, whereby adjacent ends of the conductors are fused together to form a thermocouple junction, and then connecting the casing electrically as an anode and bombarding it with plasma electrons, whereby the end of the casing is fused to form a sealed end closure insulated from the thermocouple junction by the insulating material.

2. A method of manufacturing a thermocouple from a thermocouple cable having conductor wires surrounded by refractory insulating material in a tubular metal casing, comprising shaping one end of the cable to include a substantially conical recess formed in the insulating material such that the conductors protrude into the bottom of the recess, heating the shaped end in a rarefied atmosphere by way of a gas plasma derived from a gas plasma generator by first connecting the conductors electrically as an anode with respect to the generator and bombarding the conductor ends with plasma electrons, whereby adjacent ends of the protruding conductors are fused together to form a thermocouple junction, and then connecting the casing electrically as an anode and bombarding it with plasma electrons, whereby the end of the casing is fused to form a sealed end closure insulated from the junction by the insulating material.

3. A method of making a thermocouple from a thermocouple cable having at least two dissimilar metal conductor wires embedded in an insulating material and surrounded by a tubular metal casing comprising, forming a recess in an end section of said thermocouple cable, positioning the recessed cable in a plasma generator apparatus with a rarefied atmosphere, connecting the conductor wires as an anode with respect to the plasma generator and bombarding the conductor ends with plasma electrons, whereby the adjacent ends of the conductors are fused together to form a thermocouple junction by gas plasma derived from the plasma generator and subsequently connecting the tubular casing as an anode and bombarding it with plasma electrons, whereby the end of the casing is fused to form a sealed end closure by gas plasma derived from the plasma generator.

References Cited by the Examiner
UNITED STATES PATENTS

| | | |
|---|---|---|
| 2,703,335 | 3/1955 | Andrus. |
| 2,858,411 | 10/1958 | Gage _____ 219—75 |
| 3,210,454 | 10/1965 | Morley _____ 219—121 X |

WILLIAM I. BROOKS, *Primary Examiner.*

WHITMORE A. WILTZ, JOHN F. CAMPBELL, JOSEPH V. TRUHE, *Examiners.*